United States Patent
Murata

(10) Patent No.: US 6,345,070 B1
(45) Date of Patent: Feb. 5, 2002

(54) MODEM

(75) Inventor: Hiroyasu Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/251,245

(22) Filed: Feb. 16, 1999

(30) Foreign Application Priority Data

May 7, 1998 (JP) .......................................... 10-124493

(51) Int. Cl.$^7$ ................................................ H04L 5/16
(52) U.S. Cl. .................... 375/220; 375/222; 375/340; 714/51; 714/52; 714/758; 714/799
(58) Field of Search ................................ 375/219, 220, 375/222, 257, 259, 340, 360, 365, 368; 714/48, 49, 50, 51, 52, 55, 758, 799, 800, 801

(56) References Cited

U.S. PATENT DOCUMENTS

| 5,396,518 | A | * | 3/1995 | How | 375/265 |
| 5,535,228 | A | * | 7/1996 | Dong et al. | 371/49.1 |
| 5,995,547 | A | * | 11/1999 | Dent | 375/242 |
| 6,028,892 | A | * | 2/2000 | Barabash et al. | 375/222 |
| 6,104,749 | A | * | 8/2000 | Lu et al. | 375/222 |

FOREIGN PATENT DOCUMENTS

JP 58-218233 12/1983

* cited by examiner

Primary Examiner—Stephen Chin
Assistant Examiner—Dac V. Ha
(74) Attorney, Agent, or Firm—Rosenman & Colin LLP

(57) ABSTRACT

The present invention is directed to preventing the generation of a jarring noise when a voice/data multiplexing modem is in a diverging condition. This is accomplished by the modem including an encoder section 14, where a voice signal encoded by mapping it to 63 codes out of the 64 codes that can be expressed with 6 bits. When the unused code is detected by a detector section 28, the reproduced voice signal is masked.

17 Claims, 5 Drawing Sheets

MODEM

BACKGROUND OF THE INVENTION

The present invention relates to a modem that encodes a voice signal, converts the encoded voice signal to a passband signal, transmits the passband signal onto an analog transmission line, receives the passband signal from the analog transmission line, converts the passband signal to a code, and then decodes it into a voice signal. Such techniques are essential for voice multiplexing modems designed to transmit voice signals together with data signals over a single analog transmission line.

In transmitting only voice over an analog transmission line, it is only necessary to send the voice signal in its original analog form over the transmission line. However, in the case of a voice/data multiplexing modem, at the transmitting end, the analog voice signal is first converted to a multi-bit code and then supplied to a transmitter together with a data signal. In the transmitter of a conventional modem, the input digital signal is modulated and converted to a passband signal for transmission over the analog line. At the receiving end, a receiver receives the passband signal from the analog line and then demodulates it into a digital data, as in the case of a receiver in a conventional modem. An encoded voice contained in the digital signal which is output from the receiver is decoded by reversing the process performed at the transmitting end, and the voice signal is thus reproduced.

Conventional modems momentarily can be thrown into a diverging condition (an out of synchronization condition) at the time of line switching or at the time of switching to a connection for loop testing. At this time, since the received signal does not remain stationary in the complex plane, random data is output from the modem receiver until after synchronization is achieved again. In this case, a voice signal is reproduced as a jarring noise having a large sound volume. Such a sound level is very unpleasant when heard through a telephone receiver.

SUMMARY OF THE INVENTION

It is accordingly an object of the present invention to provide a voice/data multiplexing modem that does not output a jarring noise when thrown into a diverging condition.

These and other objects are met in accordance with the present invention which is directed to modem including a receiver section that receives an analog signal from an analog transmission line and outputs code. The analog signal is a signal converted from an encoded voice signal that is created by mapping a voice signal to a set of codes that excludes a particular code. A decoder section that restores the voice signal from the code output from the receiver section. A detector section that detects the particular code from the code output from the receiver section. A masking section that masks an output of the decoder section when the detector section has detected the particular code.

DETAILED DESCRIPTION

Figure 1:
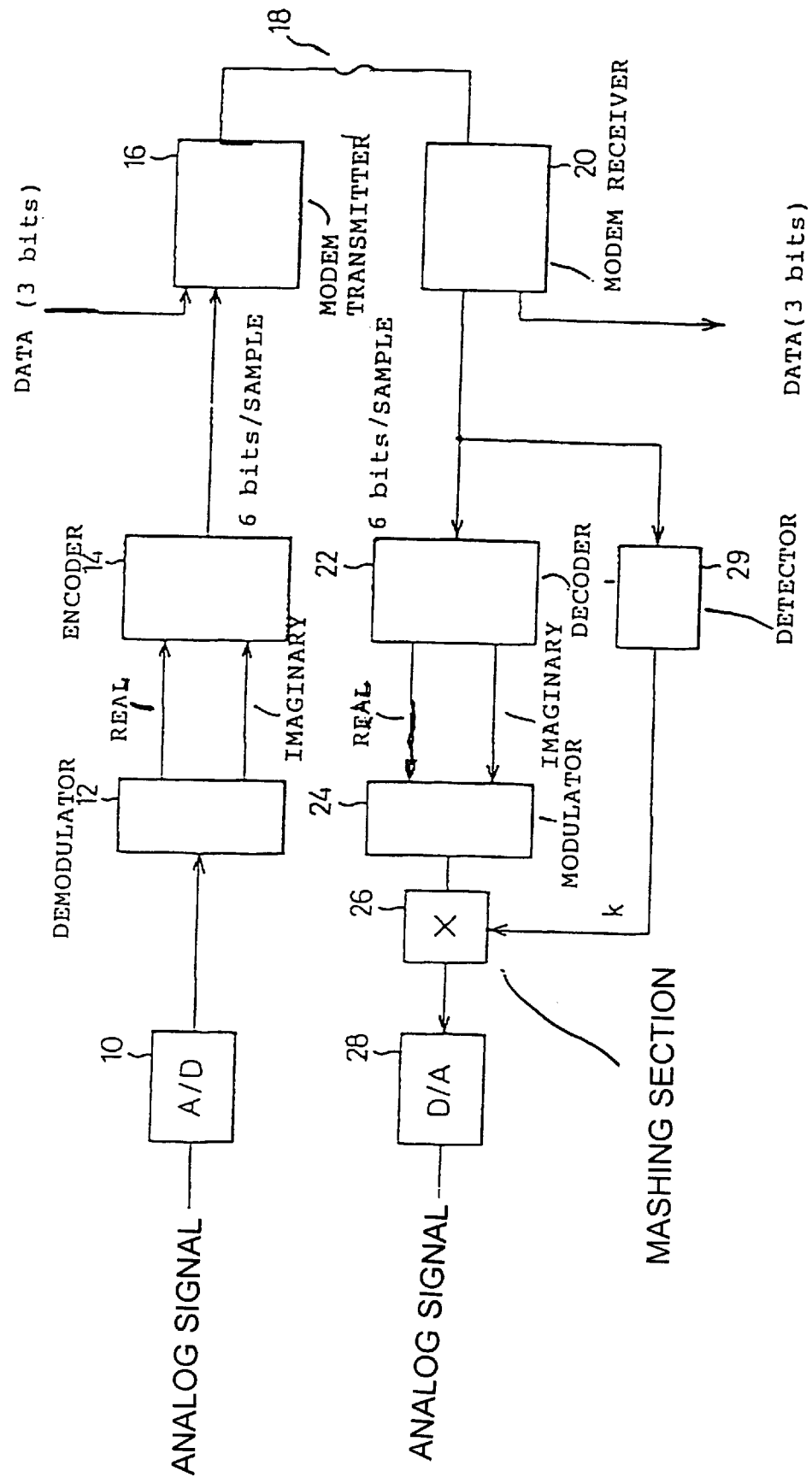
FIG. 1 is a block diagram showing a voice/data multiplexing modem according to a first embodiment of the present invention.

FIG. 1 is a block diagram showing a voice/data multiplexing modem according to a first embodiment of the present invention. In order to implement most of the processing by digital signal processing using a DSP (digital signal processor) and the like, an analog voice signal gathered by a telephone receiver (not shown) is first converted by an A/D converter 10 into a digital signal.

Figure 2:
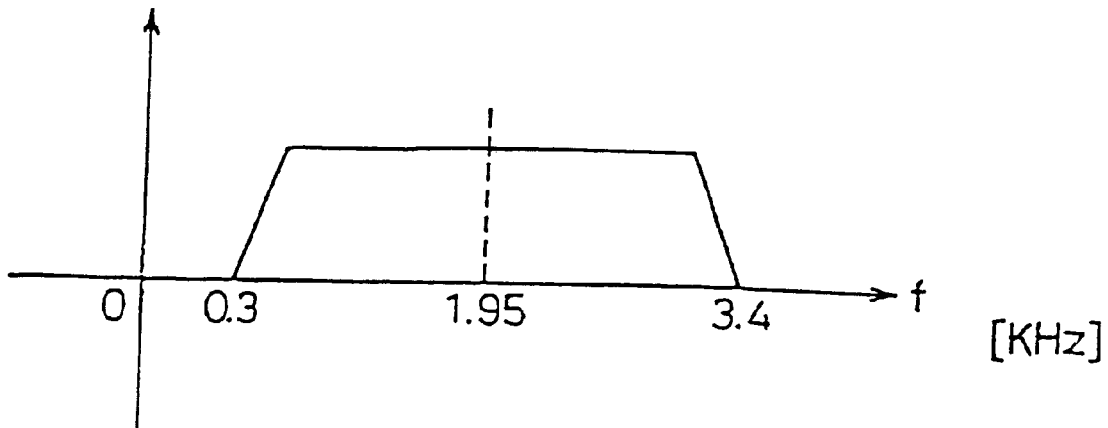
FIG. 2 is a frequency spectrum diagram showing a voice band according to the present invention.
Figure 3:
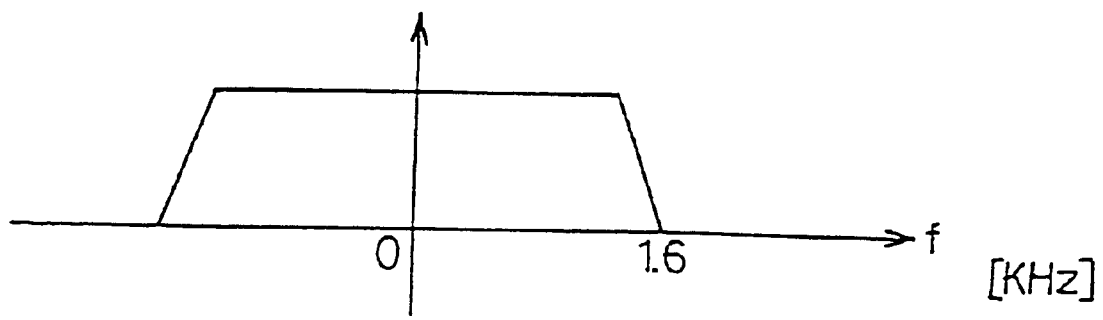
FIG. 3 is a frequency spectrum diagram showing voice converted to baseband according to the present invention.

By regarding the voice signal (FIG. 2) in the 0.3 kHz to 3.4 kHz band as a passband signal modulated onto a quadrature carrier of 1.95 kHz, a demodulator section 12 demodulates the voice signal using the 1.95 kHz quadrature carrier. This demodulation converts the voice signal from passband to baseband (FIG. 3) represented by a complex number including real and imaginary parts. Since the highest frequency in the baseband is 1.6 kHz, a sampling rate of twice this frequency, that is, at 3.2 kHz, should suffice. If the passband signal of FIG. 2 were encoded in its original form and multiplexed with the data signal, the 0 to 0.3 kHz band would be wasted. However, by demodulating to a baseband, such waste is eliminated and thus efficient encoding is achieved.

Figure 4:
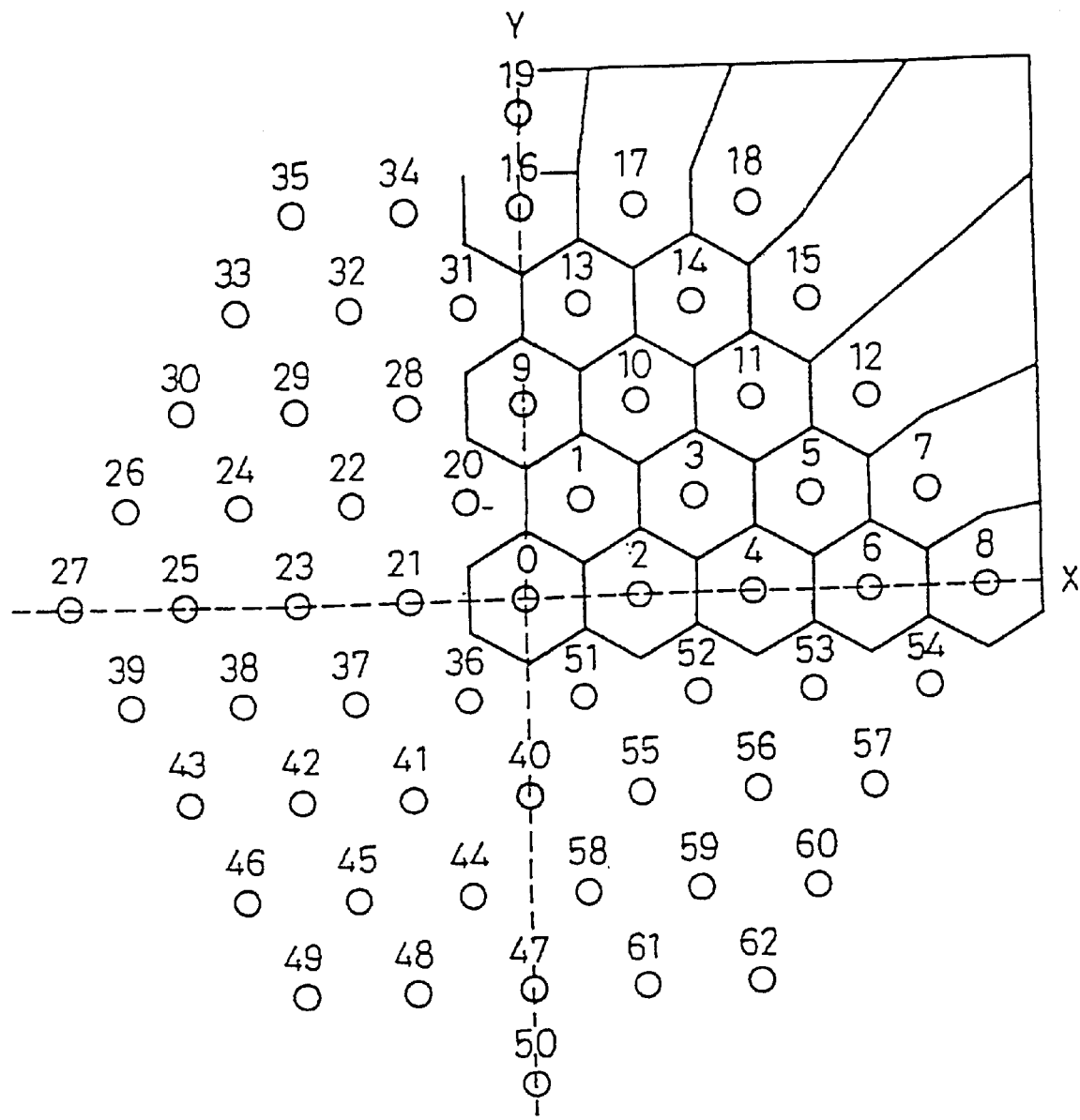
FIG. 4 is a diagram showing an example of decision regions for encoding/decoding according to the present invention.

With the complex plane divided into 63 hexagonal regions as shown in FIG. 4, an encoder section 14 makes a decision in which region the input complex baseband signal lies, and encodes the signal into a 6-bit code accordingly. In FIG. 4, small circles show signal points, and hexagons are only shown in the first quadrant. The hexagons in the second, third, and fourth quandrants are obtained by rotating the hexagons in the first quadrant through 90°, 180°, and 270°, respectively. Since there are $2^6=64$ codes that can be expressed with 6 bits, one of them is not used as a voice code.

The encoded voice signal of 6 bits and a data signal of 3 bits are then input to a modem transmitter section 16. A total of 9 bits are converted as one symbol to a passband by using a known modulation technique and then transmitted on an analog transmission line 18. Since the sampling rate is 3.2 kHz, the illustrated modem transmits voice at 19.2 kbps (=6 bits×3.2 kHz) and data at 9.6 kbps (=3 bits×3.2 kHz), that is, 28.8 kbps in total. A modem receiver section 20 then receives an analog signal from the analog transmission line 18, demodulates 9 bits of data per symbol by using a known demodulation technique. The modem receiver section 20 further outputs 6 bits of voice data and 3 bits of data.

A decoder section 22 decodes the complex baseband voice signal by reversing the conversion performed by the encoder section 14, that is, by mapping the 6-bit code to a signal point in FIG. 4. A modulator section 24 restores the voice signal by reversing the processing performed by the demodulator section 12, that is, by modulating the baseband signal onto a 1.95 kHz quadrature carrier. A masking section 26 then multiplies the output of the modulator section 24 by a multiplier value k supplied from a detector section 29, and outputs the result.

As long as the modem receiver section 20 is operating normally, of the 9 bits output, 6 bits assigned to the voice represents one of the 63 codes used for voice encoding out of the $2^6=64$ codes that can be expressed with 6 bits. However, when the modem is thrown into a diverging condition, the 64 codes appear in a random manner since the received signal does not remain stationary in the complex plane. When the 6-bit code output from the modem receiver section 20 as the voice signal is one of the 63 codes used for voice encoding, the detector section 29 outputs "1" as the multiplier value k. When it is detected that the 6-bit code is the code not used for voice encoding, then it is determined that the modem is in a diverging condition, and "0" is output as the multiplier value k. Since the masking section 26 produces an output by multiplying the output of the modulator section 24 by k, the multiplication result is 0 regardless of the output of the modulator section 24 when the modem is in a diverging condition. Thus, the masking section 26 masks the abnormal noise output from the modulator section 24.

Figure 5:
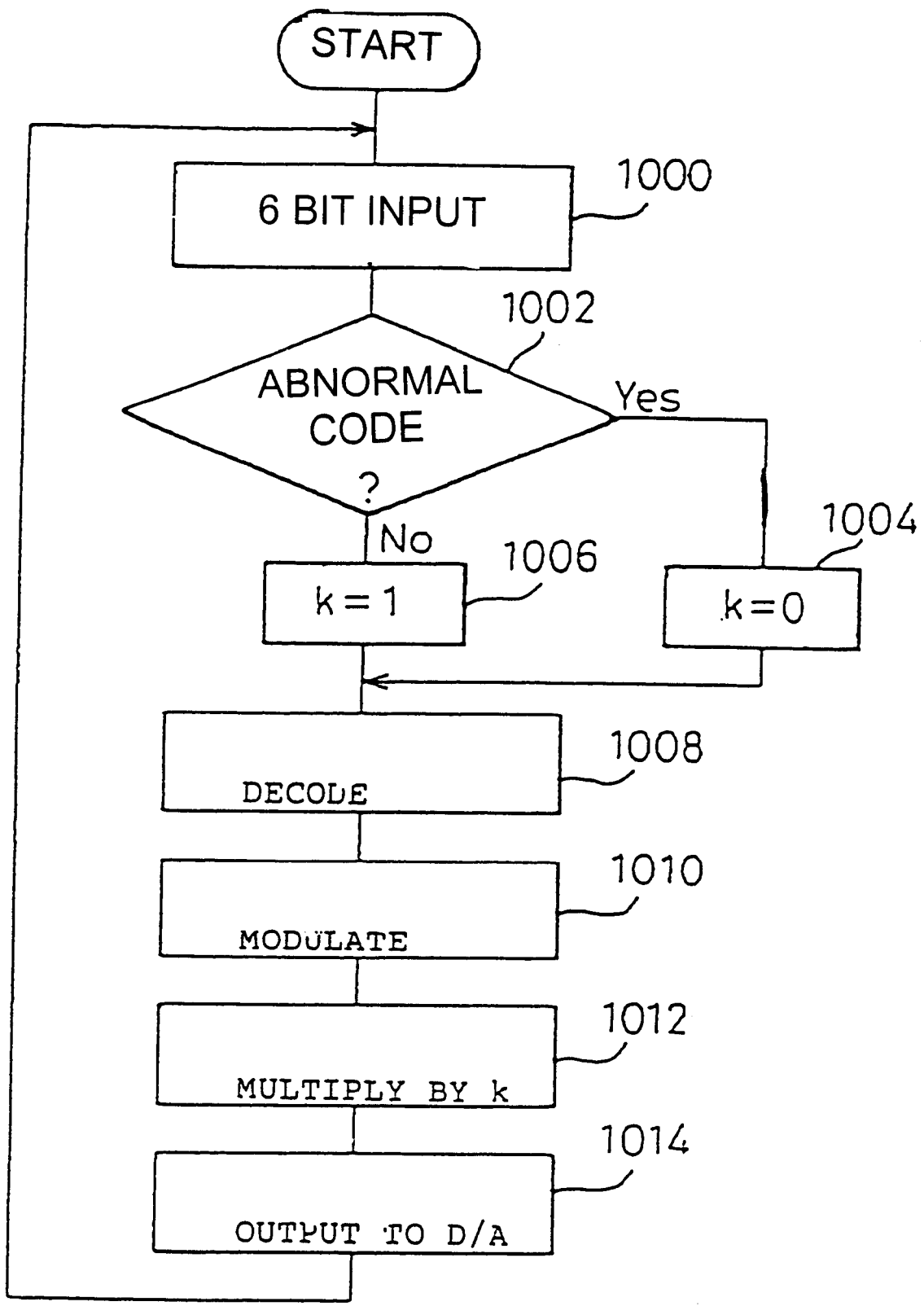
FIG. 5 is a flowchart illustrating processing in the first embodiment of the present invention.

FIG. 5 is a flowchart illustrating the operation of the detector section 29, decoder section 22, modulator section 24, and masking section 26 in the first embodiment of the present invention. In FIG. 5, for the 6 input bits (step 1000) a decision is made as to whether the 6-bit input is an abnormal code or not (step 1002). If it is an abnormal code, the multiplier value k is set to "0" (step 1004). If the 6 input bits is a voice code, the multiplier value k is set to "1" (step 1006). In step 1008, the input code is decoded back into the voice baseband signal. In step 1010, the baseband signal is modulated to passband. In step 1012, the output is multiplied by k, and in step 1014, the result of the multiplication is fed to the D/A converter 28, after which the process returns to step 1000.

Referring back to FIG. 1, the D/A converter 28 converts the digital voice signal, output from the masking section 26, into an analog signal which is output.

Even when the modem is not in a diverging condition, a situation can occur where an unused code is momentarily output from the modem receiver section 20 because of a transmission error. Further, in a diverging condition, random values, that is all 64 codes are output with equal frequency of occurrence. When the sampling rate is 3.2 kHz, 3,200 codes are output per second, and one in every 64 codes is an abnormal code. This means that $3,200 \times \frac{1}{64} = 50$ abnormal codes are output per second. Accordingly, it is desirable that the number of abnormal codes detected within a predetermined time is counted. Further, the masking according to the present invention can be effected for a few seconds if the detected number exceeds a predetermined threshold value. By so doing, not only can the diverging condition of the modem be reliably detected to mask the abnormal noise, but voice interruptions can also be prevented from occurring due to the abnormal codes momentarily output when the modem is not in the diverging condition.

Figure 6:
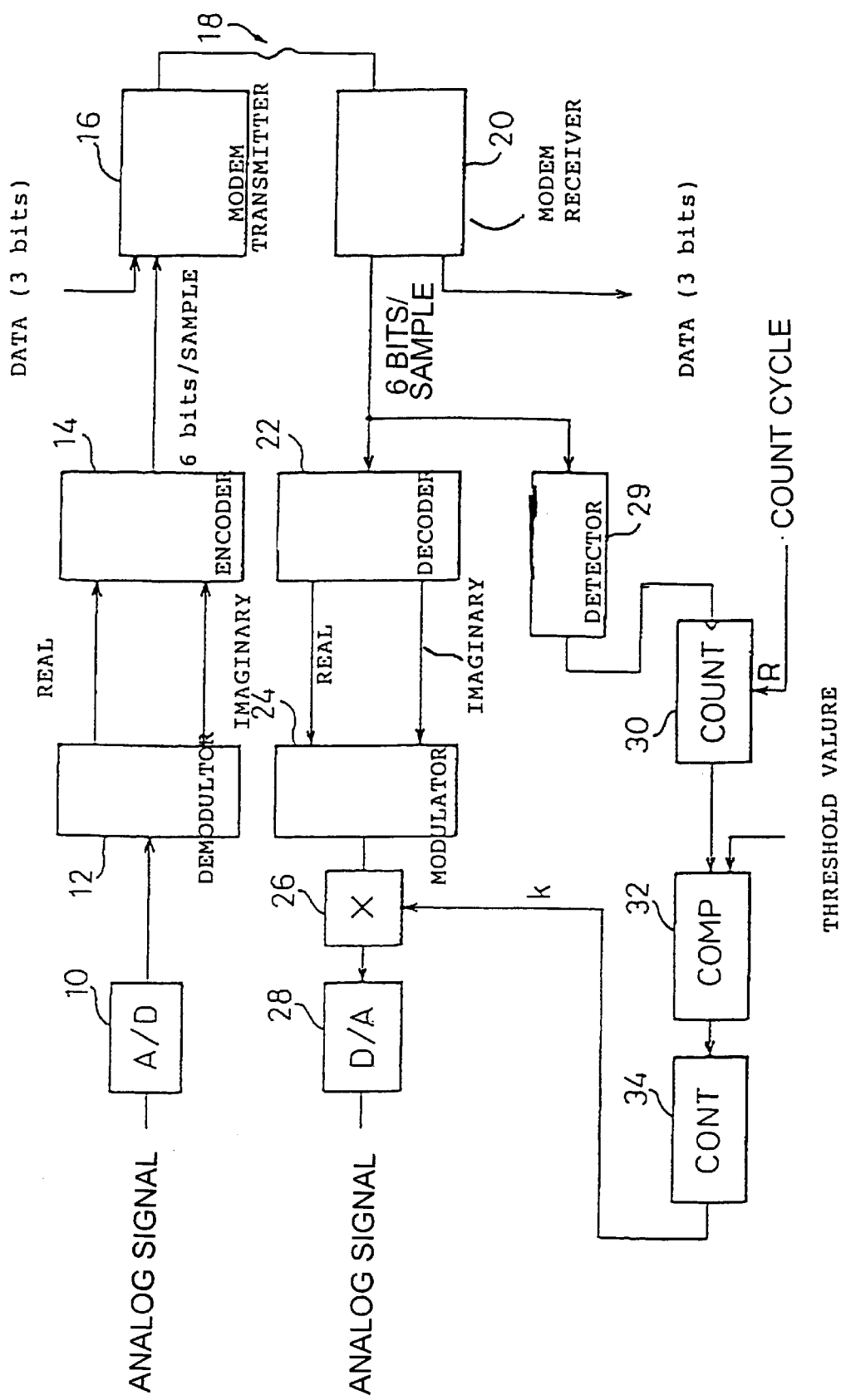
FIG. 6 is a block diagram showing a voice/data multiplexing modem according to a second embodiment of the present invention.

FIG. 6 is a block diagram showing a voice/data multiplexing modem according to a second embodiment of the present invention. In the second embodiment, the above mentioned counting of the abnormal codes is implemented. The same constituent elements shown in FIG. 1 are designated by the same reference numerals, and explanatory descriptions of such elements are omitted. A counter 30 counts the number of abnormal codes detected by the detector section 29 in a predetermined period time. The counter 30 is reset to "0" for each count cycle which corresponds to the above-mentioned predetermined time, and thus outputs a value corresponding to the number of abnormal codes detected during the predetermined time. A comparator 32 compares this value with the predetermined threshold value. The result of the comparison from the comparator 32 is fed to a controller 34 which, if the count value of the counter 30 is larger than the threshold value, continues to output "0" as the value of k for a few seconds after that. Otherwise, the controller 34 outputs a "1" as the value of k.

As described above, according to the present invention, a voice/data multiplexing modem is provided that does not output a jarring noise when the modem is thrown into a diverging condition.

There has been disclosed heretofore the best embodiments of the invention. However, it is to be understood that various changes and modifications may be made without departing from the spirit of the invention.

What is claimed is:

1. A modem comprising:

an encoder for encoding a voice signal into a subset of codes, wherein said subset of codes are contained in a set of codes, said subset excluding a particular code that is in said set of codes, a receiver section for receiving a signal including at least said subset of codes;

a decoder section for restoring the voice signal from said received codes that are output from said receiver section;

a detector section for detecting whether said codes output from said receiver section include said particular code; and a masking section for masking an output of said decoder section when said detector section has detected said particular code.

2. The modem of claim 1, wherein said masking section masks the output of said decoder section when said detector section has detected a plurality of occurrences of said particular code within a predetermined time.

3. The modem of claim 2, further comprising a counter for counting said plurality of occurrences of said particular code.

4. The modem of claim 3, further comprising a comparator for comparing said plurality of occurrences of said particular code counted by said counter to a threshold value.

5. The modem of claim 4, wherein said masking section masks the output of said decoder section when said plurality of occurrences of said particular code exceeds said threshold.

6. The modem of claim 1, further comprising a modulator section for converting the output of said decoder section from a baseband to a passband.

7. The modem of claim 1, wherein said codes are 6-bit codes.

8. The modem of claim 7, wherein said particular code being one of 64 codes.

9. The modem of claim 1, wherein said subset of codes are produced by mapping a voice signal.

10. The modem of claim 1, wherein the analog signal has a maximum frequency of 1.6 kHz.

11. A method for preventing a diverging condition in a modem, said method comprising the steps of:

encoding a voice signal into a subset of codes, wherein said subset of codes are contained in a set of codes, said subset excluding a particular code that is in said set of codes;

receiving a transmitted signal including at least said subset of codes;

decoding the received codes in order to reproduce the voice signal; and detecting occurrences of said particular code in the transmitted signal; and multiplying the voice signal by "0" when a predetermined number of occurrences of said particular code are detected in said received signal.

12. The method of claim 11, wherein the voice signal encoded has a maximum frequency of 1.6 kHz.

13. The method of claim 11, wherein said codes are 6-bit codes.

14. The method of claim 13, wherein said particular code being one of 64 codes.

15. The method of claim 11, wherein the voice signal is multiplied by a value other than "0" when said particular code is not detected.

16. The method of claim 11, wherein said predetermined number of occurrences is one.

17. The method of claim 11, wherein said predetermined number of occurrences is more than one.

* * * * *